(12) United States Patent
Tani

(10) Patent No.: US 10,732,052 B2
(45) Date of Patent: Aug. 4, 2020

(54) TEMPERATURE DISPLAY DEVICE ISSUING APPARATUS

(71) Applicant: Seiko Instruments Inc., Chiba-shi, Chiba (JP)

(72) Inventor: Kazuo Tani, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 219 days.

(21) Appl. No.: 15/927,336

(22) Filed: Mar. 21, 2018

(65) Prior Publication Data

US 2018/0274983 A1    Sep. 27, 2018

(30) Foreign Application Priority Data

Mar. 24, 2017   (JP) .................................. 2017-059492

(51) Int. Cl.
| | |
|---|---|
| G01K 1/00 | (2006.01) |
| G01K 1/02 | (2006.01) |
| G01K 3/04 | (2006.01) |
| B65C 11/02 | (2006.01) |
| G01K 11/12 | (2006.01) |
| B41J 3/407 | (2006.01) |
| G01K 11/18 | (2006.01) |
| G09F 3/10 | (2006.01) |

(52) U.S. Cl.
CPC ............ *G01K 1/028* (2013.01); *B41J 3/4075* (2013.01); *B65C 11/02* (2013.01); *G01K 3/04* (2013.01); *G01K 11/12* (2013.01); *G01K 11/18* (2013.01); *G09F 3/10* (2013.01)

(58) Field of Classification Search
USPC ................................ 374/208, 161, 162, 141
See application file for complete search history.

(56) References Cited

U.S. PATENT DOCUMENTS

| | | | | |
|---|---|---|---|---|
| 6,116,709 | A | * | 9/2000 | Hirabayashi ......... B41J 2/04528 347/14 |
| 6,382,125 | B1 | * | 5/2002 | Tamura .................... B41M 5/28 116/207 |
| 6,787,108 | B2 | * | 9/2004 | Ribi ..................... G01N 31/229 116/206 |

(Continued)

FOREIGN PATENT DOCUMENTS

| | | |
|---|---|---|
| DE | 10 2007 05691 | 5/2009 |
| JP | 2014-15552 A | 1/2014 |

OTHER PUBLICATIONS

Extended European Search Report for European Application No. 18163311.6 dated Jul. 19, 2018, pp. 1-8.

*Primary Examiner* — Mirellys Jagan
(74) *Attorney, Agent, or Firm* — Blinks Gilson & Lione

(57) ABSTRACT

A temperature display device issuing apparatus is configured to issue a temperature display device including a temperature indicator having a function of starting temperature detection when irradiated with light. The temperature display device issuing apparatus includes: a printing/recording device configured to print time information on the temperature display device; an irradiation device configured to irradiate the light onto the temperature indicator of the temperature display device; and a controller configured to control printing in the printing/recording device and irradiation in the irradiation device.

18 Claims, 6 Drawing Sheets

(56) References Cited

U.S. PATENT DOCUMENTS

| | | | |
|---|---|---|---|
| 7,682,830 B2* | 3/2010 | Prusik | G01N 31/229 |
| | | | 116/216 |
| 2007/0206982 A1 | 9/2007 | Roth et al. | |
| 2009/0229734 A1 | 9/2009 | Uber et al. | |
| 2013/0185706 A1* | 7/2013 | Dominick | G06F 8/60 |
| | | | 717/168 |
| 2019/0064008 A1* | 2/2019 | Tani | G01K 1/024 |
| 2019/0101451 A1* | 4/2019 | Sambongi | G02B 5/23 |
| 2019/0283458 A1* | 9/2019 | Ohnishi | B41J 2/21 |
| 2019/0383649 A1* | 12/2019 | Abdo | B32B 7/12 |

* cited by examiner

TEMPERATURE DISPLAY DEVICE ISSUING APPARATUS

RELATED APPLICATIONS

This application claims priority under 35 U.S.C. § 119 to Japanese Patent Application No. 2017-059492 filed on Mar. 24, 2017, the entire content of which is hereby incorporated by reference.

BACKGROUND OF THE INVENTION

1. Field of the Invention

The present invention relates to a temperature display device issuing apparatus.

2. Description of the Related Art

Hitherto, it is well understood from experience that food and medicines, for example, generally require paying attention to the time elapsed since manufacture or the breaking of the seal, and to the storage temperature environment. For instance, dairy products deteriorate rapidly after manufacture.

Most types of medicines, whatever hard-to-cure diseases the medicines are expected to cure, do not work unless the manners and temperature environments of storage are ones in which those particular medicines are supposed to be stored. Vaccines, which are a typical example of medicines used in winter every year, are biologically derived products to be stored in a manner that varies from one type to another type, and the potency of a vaccine changes depending on how the vaccine is handled.

A rapid increase in the number of highly temperature-sensitive products is predicted for the future markets of food and medicine. Proper management of each individual product as a tool for solving social problems in terms of environment and resources is becoming more and more important in a diversity of uses.

The need to monitor the lifetime and state of a product by way of time and temperature management applies to corporations as well as individuals. The monitoring therefore requires an indicator, a tag, a label, and the like that is simple and reliable, and capable of detecting and displaying time and temperature. A material using a photochromic compound, for example, is known as a temperature history display material of this type.

When a practical use is assumed for a temperature history display material of this type, however, the material desirably allows a check on the state of temperature management at any time instead of being usable only for a predetermined length of elapsed time. A prerequisite for the any-time check is to present a temperature history by recognizing the time at which a temperature detection function comes into effect and using a table that indicates a color difference actually observed after the elapse of a time. However, it is not easy with existing temperature history display materials to display an accurate temperature history. An apparatus configured to issue a temperature display device, which is capable of displaying an accurate temperature history, is therefore sought after in such fields.

SUMMARY OF THE INVENTION

According to one embodiment of the present invention, there is provided a temperature display device issuing apparatus, which is configured to issue a temperature display device, the temperature display device including a temperature indicator having a function of starting temperature detection when irradiated with light, the temperature display device issuing apparatus including: a printing/recording device configured to print time information on the temperature display device; an irradiation device configured to irradiate the light onto the temperature indicator of the temperature display device; and a controller configured to control printing in the printing/recording device and irradiation in the irradiation device.

In the above-mentioned apparatus according to the one embodiment of the present invention, wherein.

In the above-mentioned apparatus according to the one embodiment of the present invention, wherein the temperature indicator includes a material having color that is changed by irradiation of light of a particular wavelength.

In the above-mentioned apparatus according to the one embodiment of the present invention, wherein the light irradiated onto the temperature indicator by the irradiation device includes an ultraviolet ray.

In the above-mentioned apparatus according to the one embodiment of the present invention, wherein the controller includes a time keeper configured to measure an irradiation time in which the temperature indicator is irradiated with the light, and wherein the printing/recording device is configured to print, on the temperature display device, a time at which the temperature indicator starts temperature detection, based on the irradiation time output from the time keeper.

In the above-mentioned apparatus according to the one embodiment of the present invention further including a communicator through which the controller receives, from an external information terminal, display data including an irradiation time in which the temperature indicator is irradiated with the light, wherein the printing/recording device is configured to print, on the temperature display device, a time at which the temperature indicator starts temperature detection, based on the display data received through the communicator.

In the above-mentioned apparatus according to the one embodiment of the present invention, wherein the display data further includes commercial product name information, which is to be printed along with the irradiation time, and wherein the printing/recording device is configured to print, on the temperature display device, the commercial product name information along with a time at which the temperature indicator starts temperature detection, based on the display data received through the communicator.

In the above-mentioned apparatus according to the one embodiment of the present invention, wherein the controller is configured to transmit, to the external information terminal, through the communicator, print history information, which associates the commercial product name information printed by the printing/recording device with the time printed by the printing/recording device as a time at which the temperature indicator starts temperature detection.

In the above-mentioned apparatus according to the one embodiment of the present invention, wherein the irradiation device is placed on a downstream side of the printing/recording device in a conveyance direction in which the temperature display device is conveyed.

In the above-mentioned apparatus according to the one embodiment of the present invention, wherein the irradiation device is placed on an upstream side of the printing/recording device in a conveyance direction in which the temperature display device is conveyed.

In the above-mentioned apparatus according to the one embodiment of the present invention, further including a rolled paper housing device configured to house a roll of paper in a manner that allows the roll to rotate freely, the roll of paper being a wound long chain of the plurality of temperature display devices.

In the above-mentioned apparatus according to the one embodiment of the present invention, further including a cutting device configured to cut the temperature display device on which the printing of the information and the irradiation of the light are already performed into pieces, each of which has a desired length and serves as a single-sheet temperature display device.

In the above-mentioned apparatus according to the one embodiment of the present invention, wherein the temperature display device includes a heat-sensitive paper area, which develops color when heated, and wherein the printing/recording device includes: a thermal head configured to heat the heat-sensitive paper area; and a platen roller configured to convey the temperature display device sandwiched between the platen roller and the thermal head.

DETAILED DESCRIPTION OF THE EMBODIMENTS

Figure 4:
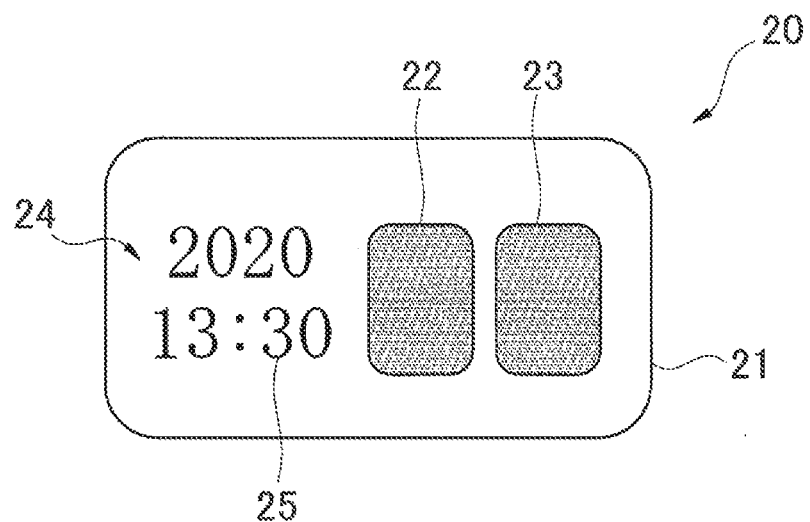
FIG. 4 is a diagram for illustrating a first example of a temperature display device.

Embodiments of the present invention are described with reference to the drawings. Before a description is given on a temperature display device issuing apparatus according to a first embodiment of the present invention, examples of a temperature display device issued by the issuing apparatus are described. FIG. 4 is a diagram for illustrating a temperature display device 20, which is a first example of the temperature display device. As illustrated in FIG. 4, the temperature display device 20 includes a base sheet 21, a reference section 22, a temperature indicator 23, and a time information display section 24. Examples of the substance of the base sheet 21 include glass, plastic, paper, and metal (e.g., aluminum). The base sheet 21 may have a board shape, a film shape, or other similar shapes. It is preferred for the base sheet 21 to have flexibility. The base sheet 21 may be transparent or non-transparent with respect to light (e.g., an ultraviolet ray) irradiating the temperature indicator 23. The base sheet 21 may have, for example, a card shape substantially rectangular in plan view.

A substance easy to print on by a recording method used in a printing/recording device (described later with reference to FIG. 1) can be selected for the base sheet 21. Instead of the recording method, the forming of the temperature indicator 23, ink adhesion, the pattern arrangement of printed pieces, or other factors may be taken into consideration in the selection of the substance of the base sheet 21. For example, when at least a part of a surface area of the base sheet 21 is made of heat-sensitive paper, the heat-sensitive paper area develops color from being heated. The heat-sensitive paper area can be printed on when the printing/recording device (described later with reference to FIG. 1) adopts a thermal recording method.

The temperature display device 20 is assumed to be attached, when in use, to a target product whose temperature is to be detected, and the shape and size of the base sheet 21 are therefore selected based on the specifications, size, usage, and the like of the target product. The base sheet 21 may have an adhesive layer on one side. In this way, the temperature display device 20 can be stuck to a target product when in use.

The reference section 22 presents a reference color, which serves as an index for identifying the color of the temperature indicator 23. A visual comparison of the temperature indicator 23 to the reference section 22 facilitates the identification of the color of the temperature indicator 23.

The temperature indicator 23 has a function of starting temperature detection when irradiated with light. The temperature indicator 23 includes, for example, a material whose color is changed by the irradiation of light of a particular wavelength. The use of a material changing color by light irradiation facilitates a visual check of the temperature indicator. A material developing color by the irradiation of light of a particular wavelength (e.g., an ultraviolet ray), thus becoming capable of displaying a change in temperature, for example, a material whose developed color fades (is lost) irreversibly at a rate that varies depending on the temperature, is preferred as the color changing material. This material can start temperature detection by developing color by the irradiation of light of a particular wavelength. When the light is an ultraviolet ray, the irradiation of an ultraviolet ray causes the temperature indicator 23 to develop color. With the use of the ultraviolet range or other light wavelength ranges outside the visible light range, the start of the temperature detection of the temperature indicator can be triggered at any timing.

Examples of a material that develops color by irradiation of light of a particular wavelength and whose developed color fades (is lost) at a rate that varies depending on the temperature include a photochromic compound. Examples of the photochromic compound include diarylethene-based, azobenzene-based, spiropyran-based, and fulgide-based photochromic compounds. Of those, the diarylethene-based photochromic compound is preferred from the viewpoint of, for example, heat stability, repetition durability, high sensitivity, and photoreactivity under various temperatures. An example of the diarylethene-based photochromic compound is shown in the general formula (1):

[General formula (1)]

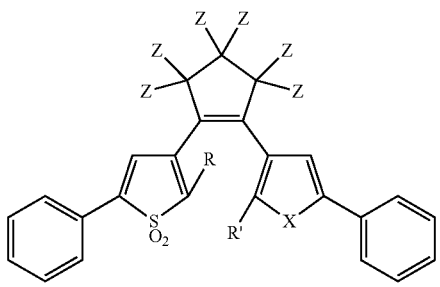

in the general formula (1), X represents a sulfur atom (S) or a sulfonyl group ($SO_2$), Z represents a hydrogen atom (H) or a fluorine atom (F), R and R' are identical to or different from each other, and each represent an alkyl group having 1 to 6 carbon atoms or a cycloalkyl group having 3 to 7 carbon atoms, and at least one of R and R' represents a secondary alkyl group having 3 to 7 carbon atoms.

The photochromic compound develops color by irradiation of light of a particular wavelength, for example, the ultraviolet range (e.g., from 250 nm to 400 nm). The photochromic compound of the general formula (1) develops color by light irradiation by bonding two substituents R's (herein R' represents the same as R) bonded to two thiophene rings to form a ring (ring-closing). The photochromic compound that has developed color is stable under less than a given temperature, but the developed color fades (is lost) when exposed to the condition of the given temperature or more (when heated).

Figure 5:
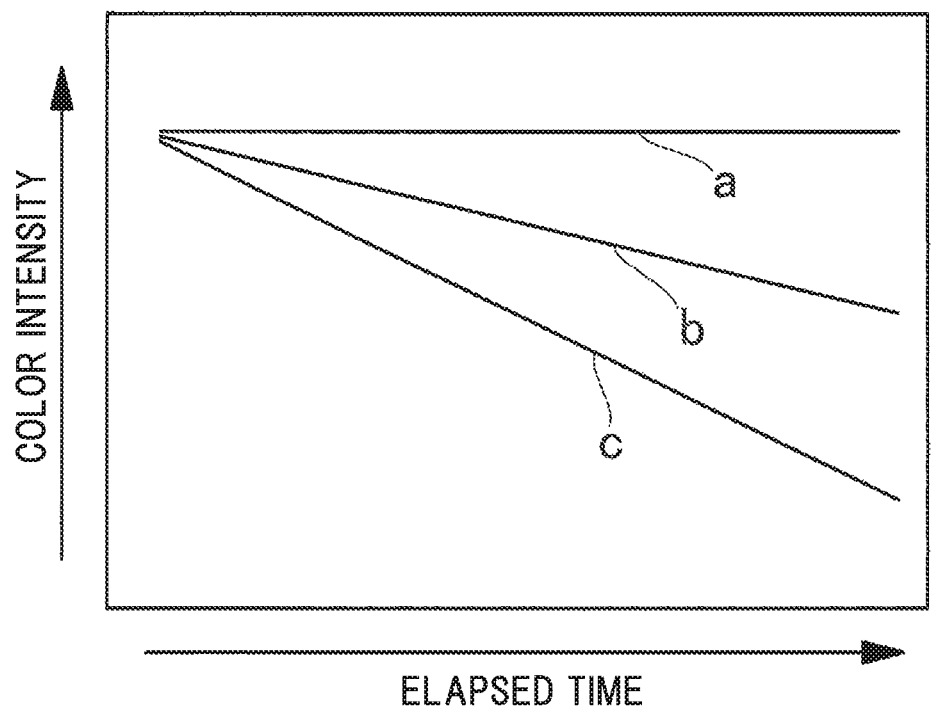
FIG. 5 is a graph for showing an example of color fading characteristics in a temperature indicator.

FIG. 5 is a graph for showing an example of color fading characteristics in the temperature indicator 23. The axis of ordinate in FIG. 5 indicates the intensity (for example, brightness) of the color of the temperature indicator 23 (see FIG. 4), and a higher intensity equals a deeper color. The axis of abscissa indicates the elapsed time. The color of the temperature indicator 23, after being developed by the irradiation of light of a particular wavelength, fades (is lost) with time as shown in FIG. 5. In FIG. 5, a change with time of the color at a first temperature is denoted by a reference symbol "a". A change with time of the color at a second temperature, which is higher than the first temperature, is denoted by a reference symbol "b". A change with time of the color at a third temperature, which is higher than the second temperature, is denoted by a reference symbol "c". The color of the temperature indicator 23 thus fades (is lost) at a higher rate when the temperature is higher. The intensity of the color has a value based on the temperature, and the temperature of an environment in which the temperature display device 20 is put can accordingly be found out based on the intensity of the color.

The intensity of the color of the reference section 22, which is illustrated in FIG. 4, can be determined based on the result of measuring, in advance, under a given temperature condition, changes in the intensity of the developed color of the constituent material of the temperature indicator 23. For example, the color of the reference section 22 is set to a color developed in an expected temperature environment. By a visual comparison of the set color to the color of the temperature indicator 23, whether a product to which the temperature display device 20 is attached has been in the expected temperature environment can be inferred.

It is preferred for the constituent material of the temperature indicator 23 to be stable in the state of the developed color under visible light. The time information display section 24 is an area in which time information 25 is printed.

Figure 6:
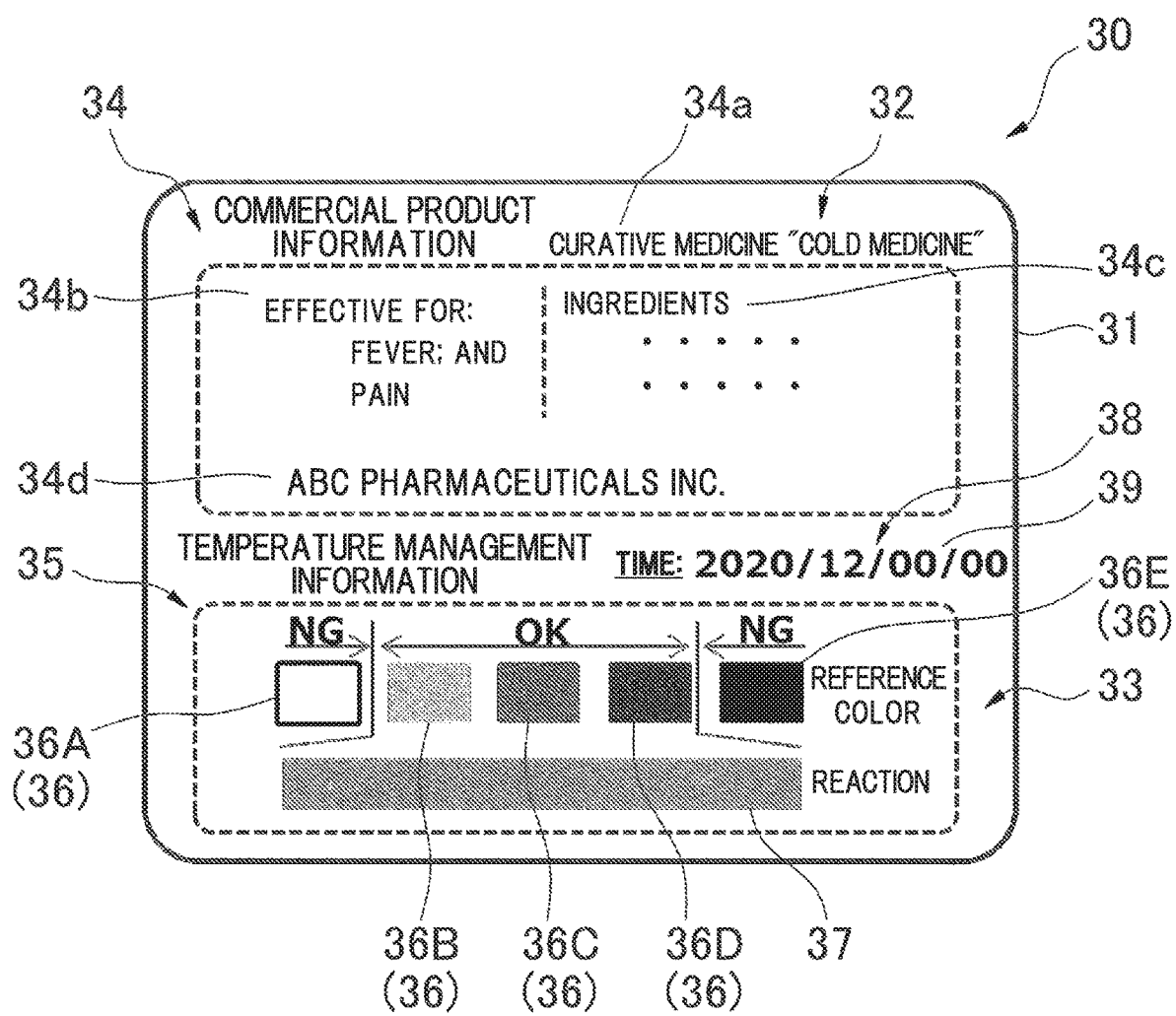
FIG. 6 is a diagram for illustrating a second example of the temperature display device.

FIG. 6 is a diagram for illustrating a temperature display device 30, which is a second example of the temperature display device. As illustrated in FIG. 6, the temperature display device 30 includes a base sheet 31, a commercial product information display section 32, and a temperature management information display section 33. The commercial product information display section 32 is an area in which commercial product information 34 is printed. The commercial product information 34 is information including, when the commercial product is a medicine, for example, the commercial product's commercial product name 34a, potency 34b, ingredients 34c, and manufacturer 34d, among others.

The temperature management information display section 33 is an area in which temperature management information 35 is printed. The temperature management information display section 33 includes, for example, a plurality of reference sections 36 (36A to 36E), a temperature indicator 37, and a time information display section 38. The reference sections 36A to 36E are referred to as "first reference section 36A" to "fifth reference section 36E", respectively. The plurality of reference sections 36 (36A to 36E) present reference colors different from one another. For example, the first reference section 36A to the fifth reference section 36E present colors increasing in deepness in the order stated. In the temperature display device 30, which has the plurality of reference sections 36 in different colors, the color of the temperature indicator 37 is easily identified. A material used in the temperature indicator 37 can be, for example, the same as the material of the temperature indicator 23 of the temperature display device 20 illustrated in FIG. 4. The time information display section 38 is an area in which time information 39 is printed.

Figure 1:
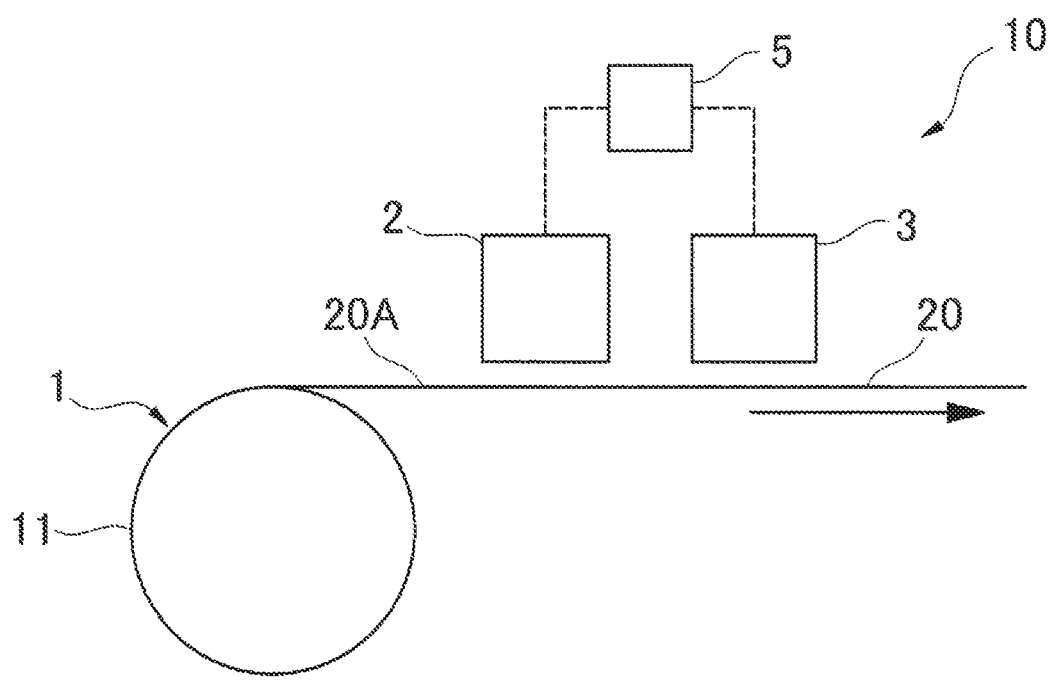
FIG. 1 is a schematic diagram for illustrating a temperature display device issuing apparatus according to a first embodiment of the present invention.
Figure 2:
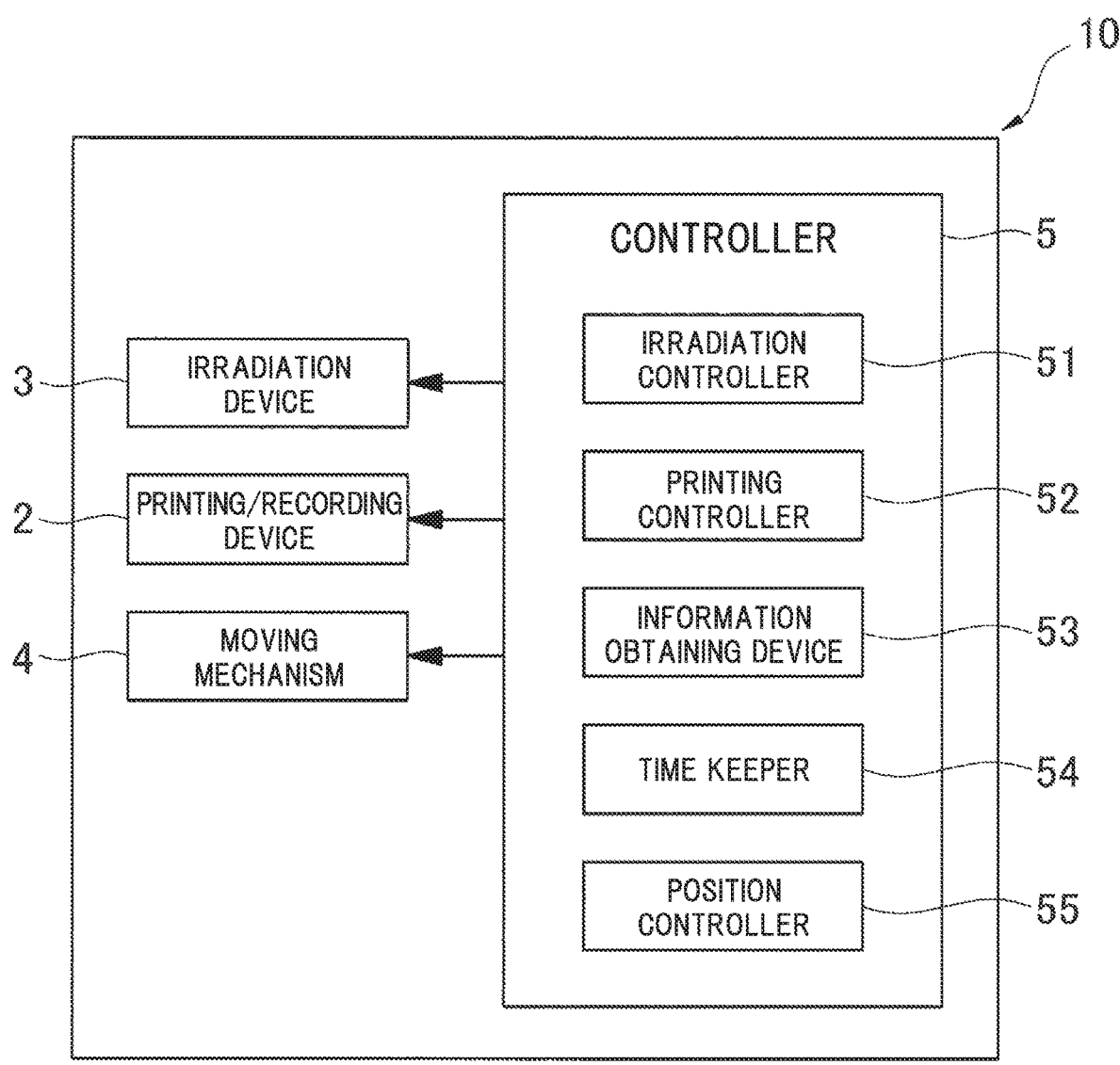
FIG. 2 is a block diagram for illustrating the temperature display device issuing apparatus of FIG. 1.

FIG. 1 is a schematic diagram for illustrating the temperature display device issuing apparatus according to the first embodiment. FIG. 2 is a block diagram for illustrating the temperature display device issuing apparatus of FIG. 1. As illustrated in FIG. 1, a temperature display device issuing apparatus 10 includes a base feeder 1, a printing/recording device 2, an irradiation device 3, a moving mechanism 4 (see FIG. 2), and a controller 5. The temperature display device issuing apparatus may hereinafter be simply referred to as "issuing apparatus".

The base feeder 1 includes, for example, a roll 11 (e.g., a roll of paper) around which a long temperature display device 20A is wound. The temperature display device 20A is a form of a temperature display device (for example, the temperature display device 20 of FIG. 4) prior to cutting, and is made up of a chain of a plurality of temperature display devices. The base feeder 1 may alternatively employ a method in which temperature display devices cut into a given size in advance are fed (a sheet-fed method).

The printing/recording device 2 can employ various printing/recording methods, for example, a thermal recording method, which uses a thermal head, an ink ribbon method, an ink jet method, an electrophotographic method, and a laser marking method (a method in which a surface is treated by irradiating the surface with light). A thermal printer using a thermal recording method is particularly preferred. Features of a thermal printer include a very small running noise, and a relatively simple structure suitable for size and weight reduction, which helps to keep the cost low. Another advantage of a thermal printer, which does not use an ink ribbon, an ink cartridge, or any other type of ink, and requires only heat-sensitive paper as a consumable supply, is simple and easy handling and low running cost.

The printing/recording device 2 prints display information (for example, the time information 25 in the temperature display device 20 of FIG. 4, and the commercial product information 34 and the time information 39 in the temperature display device 30 of FIG. 6) on the temperature display device 20A.

The irradiation device 3 includes a light source of irradiation light to be irradiated onto a temperature indicator (for example, the temperature indicator 23 of FIG. 4). The wavelength of irradiation light irradiated by the irradiation device 3 is in, for example, the ultraviolet range (e.g., from 250 nm to 400 nm). A wide range of ultraviolet rays from a short-wavelength ray used for sterilization and other purposes to a long-wavelength ray close to the visible light range can cause a temperature indicator (for example, the temperature indicator 23 of FIG. 4) to develop color. However, the selection of the wavelength of irradiation light to be used is desirably based on the absorption spectra of an open-ring body and closed-ring body of a photochromic compound.

The light source can be of LED type, lamp type, or other types. The light source can be selected based on the specifications of the temperature display device (for example, the temperature display device 20 of FIG. 4) and the specifications of the issuing apparatus 10. An ultraviolet LED is favorably used as the light source when the issuing apparatus 10 is small in size. Ultraviolet LEDs have a narrow wavelength range, and it is therefore preferred to select a wavelength from the absorption spectrum of a photochromic compound used in the temperature indicator section of the temperature display device, and select an ultraviolet LED capable of irradiating light of the selected wavelength. When a light source having a wide wavelength range as in the lamp type is used, color development characteristics of irradiation light can be adjusted with a filter in accordance with the absorption spectrum of the temperature indicator section.

The light source is provided inside a casing (not shown) of the issuing apparatus 10, for example. It is preferred to prevent light irradiated by the light source from leaking to the outside of the issuing apparatus. A preferred position of the light source is on the side downstream of the printing/recording device 2 (the downstream side in a direction in which the temperature display device is conveyed out) and close to an exit of the issuing apparatus 10 (an outlet from which the temperature display device is conveyed out). This is because, with the temperature indicator section of the temperature display device starting temperature detection by light irradiation, the temperature display device can be attached to a target product shortly after the start of temperature detection when the light source is positioned close to the exit of the issuing apparatus 10.

The moving mechanism 4 (see FIG. 2) rolls out the long temperature display device 20A from the roll 11 with the use of a motor or a similar drive device (not shown) to send the temperature display device 20A out via the printing/recording device 2 and the irradiation device 3. A temperature display device (for example, the temperature display device 20 of FIG. 4) is issued in this manner.

The controller 5 includes, for example, a central processing unit (CPU), a read-only memory (ROM), and a random access memory (RAM), which are connected to one another. The controller 5 executes, for example, a pre-stored program with the use of the CPU.

As illustrated in FIG. 2, the controller 5 includes, for example, an irradiation controller 51, a printing controller 52, an information obtaining section 53, a time keeper 54, and a position controller 55. The irradiation controller 51 controls the irradiation of light by the irradiation device 3 onto the temperature display device. The printing controller 52 controls the printing of display information on the temperature display device by the printing/recording device 2. The display information is, for example, time information indicating a time at which temperature detection of the temperature display device is started, and commercial product information.

The information obtaining section 53 obtains time information and commercial product information. The time keeper 54 measures an irradiation time in which the temperature indicator is irradiated with light by the irradiation device 3, and outputs time information (the irradiation time). With this configuration, an accurate time can be printed on the temperature display device 20A. The position controller 55 controls, for example, the conveyance of the temperature display device 20A fed from the base feeder 1. The position controller 55 outputs a control signal to the irradiation controller 51 and the printing controller 52 at timing based on the position of the temperature display device 20A, to thereby put the printing/recording device 2 and the irradiation device 3 into operation.

A method of issuing a temperature display device is described by taking as an example a case in which the temperature display device 20 of FIG. 4 is issued with the use of the issuing apparatus 10 of FIG. 1. As illustrated in FIG. 1, the temperature display device 20A is sent out from the base feeder 1. The printing/recording device 2 prints the time information 25 on the time information display section 24 (see FIG. 4). The time information 25 indicates, for example, a temperature detection start time obtained based on the time information (irradiation time) that is output from the time keeper 54.

The irradiation device 3 irradiates light onto the temperature indicator 23 (see FIG. 4). The light irradiation causes the temperature indicator 23 of the temperature display device 20A to start temperature detection. After being processed in the irradiation device 3, the temperature display device 20A is cut by a cutting device (not shown) into pieces, each of which is conveyed out of the issuing apparatus 10 as the temperature display device 20. The temperature display device 20 is issued in this manner. The temperature display device 20 is attached to a product whose temperature is to be detected.

According to the issuing apparatus 10, the printing of the time information 25 and light irradiation for starting temperature detection can be conducted in the same apparatus. Through the association of time information to be printed with a temperature detection start time, a time lag between time information recorded in the temperature display device 20 and a time at which temperature detection has actually been started is reduced, and an accurate temperature history can accordingly be displayed to a user. In addition, the temperature display device 20 is stored inside the issuing apparatus 10 until the temperature display device 20 is issued, thereby minimizing the effect of an external stimulus (light) on the characteristics of the temperature indicator 23, and a stable temperature display function is consequently achieved. The temperature display device 20 is not conveyed out of the issuing apparatus 10 until the printing of the time information 25 and light irradiation for starting temperature detection are executed, and falsification such as intentional changing of information about the start of temperature detection, an erroneous operation by a user, and the like can thus be prevented.

The irradiation device 3 in the issuing apparatus 10 is on the downstream side of the printing/recording device 2 in a conveyance direction in which the temperature display device 20A is conveyed. When the printing/recording device 2 of the heat-sensitive recording type is used, the temperature display device 20A is heated during printing, but temperature detection is not started at the time of printing because the printing/recording device 2 is on the upstream side of the irradiation device 3 in the conveyance direction. The heating during printing accordingly does not affect the temperature history. An accurate temperature history can be displayed as a result.

The issuing apparatus according to the first embodiment may also be configured so that the irradiation device 3 is on the upstream side of the printing/recording device 2 in the conveyance direction of the temperature display device 20A. With this configuration, printing is performed after light irradiation by the irradiation device 3 and, accordingly, is not affected by the light irradiation, which means less risk of blurred printing and other printing-related defects.

Figure 3:
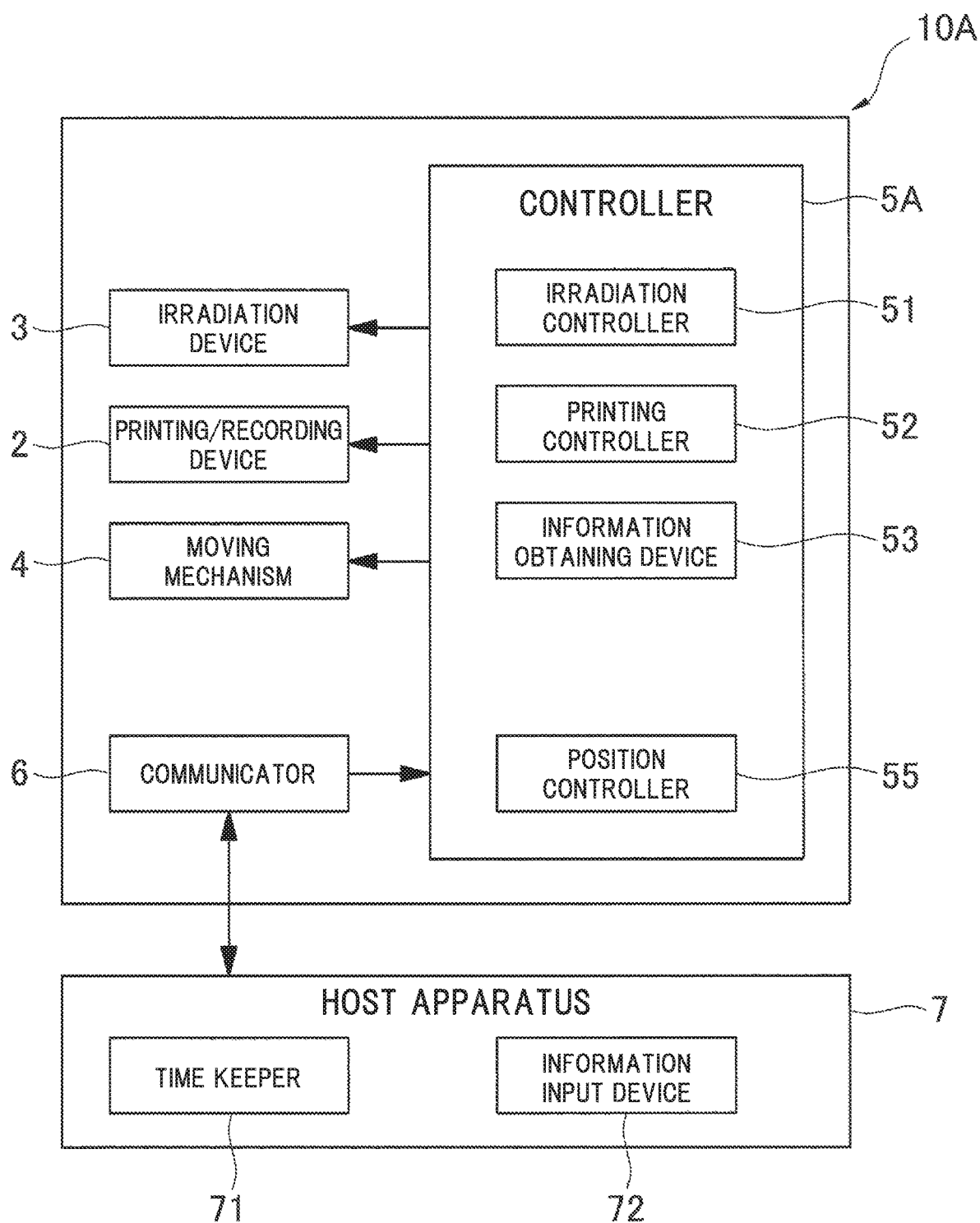
FIG. 3 is a block diagram for illustrating a modification example of the temperature display device issuing apparatus according to the first embodiment.

FIG. 3 is a block diagram for illustrating an issuing apparatus 10A, which is a modification example of the issuing apparatus 10 of FIG. 2. Components of the issuing apparatus 10A that are common to the issuing apparatus 10 of FIG. 2 are denoted by the same reference symbols, and descriptions on the common components are omitted. The issuing apparatus 10A includes the base feeder 1 (see FIG. 1), the printing/recording device 2, the irradiation device 3, the moving mechanism 4, a controller 5A, a communicator 6, and a host apparatus 7. The issuing apparatus 10A differs from the issuing apparatus 10 of FIG. 2 in that the controller 5A replaces the controller 5 of FIG. 2, and in that the communicator 6 and the host apparatus 7 (an external information terminal) are included. The host apparatus 7 includes a time keeper 71 and an information input device 72. The information obtaining section 53 of the controller 5A is capable of obtaining display data, which includes time information (for example, an irradiation time in which the irradiation device 3 irradiates light onto the temperature indicator), commercial product information, and other types of information, from the host apparatus 7 via the communicator 6. With this configuration, accurate time information obtained from the host apparatus 7 can be printed on the temperature display device 20A, and commercial product information and the like can be displayed clearly on the temperature display device 20A.

The printing/recording device 2 of the issuing apparatus 10A illustrated in FIG. 3 prints the time information 25 in the time information display section 24 (see FIG. 4). The time information 25 indicates, for example, a temperature detection start time obtained based on the time information (irradiation time) that is output from the time keeper 71. The irradiation device 3 irradiates light onto the temperature indicator 23. The light irradiation causes the temperature indicator 23 of the temperature display device 20A to start temperature detection. After being processed in the irradiation device 3, the temperature display device 20A is conveyed out of the issuing apparatus 10A. The temperature display device 20 is issued in this manner.

The issuing apparatus 10A is also capable of transmitting print history information to the host apparatus 7 via the communicator 6. The print history information is, for example, information in which the commercial product information 34 and the time information 39 (a temperature detection start time) in the temperature display device 30 illustrated in FIG. 6 are associated with each other. This enables the host apparatus 7 to manage a printing record, and a more solid management framework is accordingly accomplished by preventing falsification.

Figure 7:
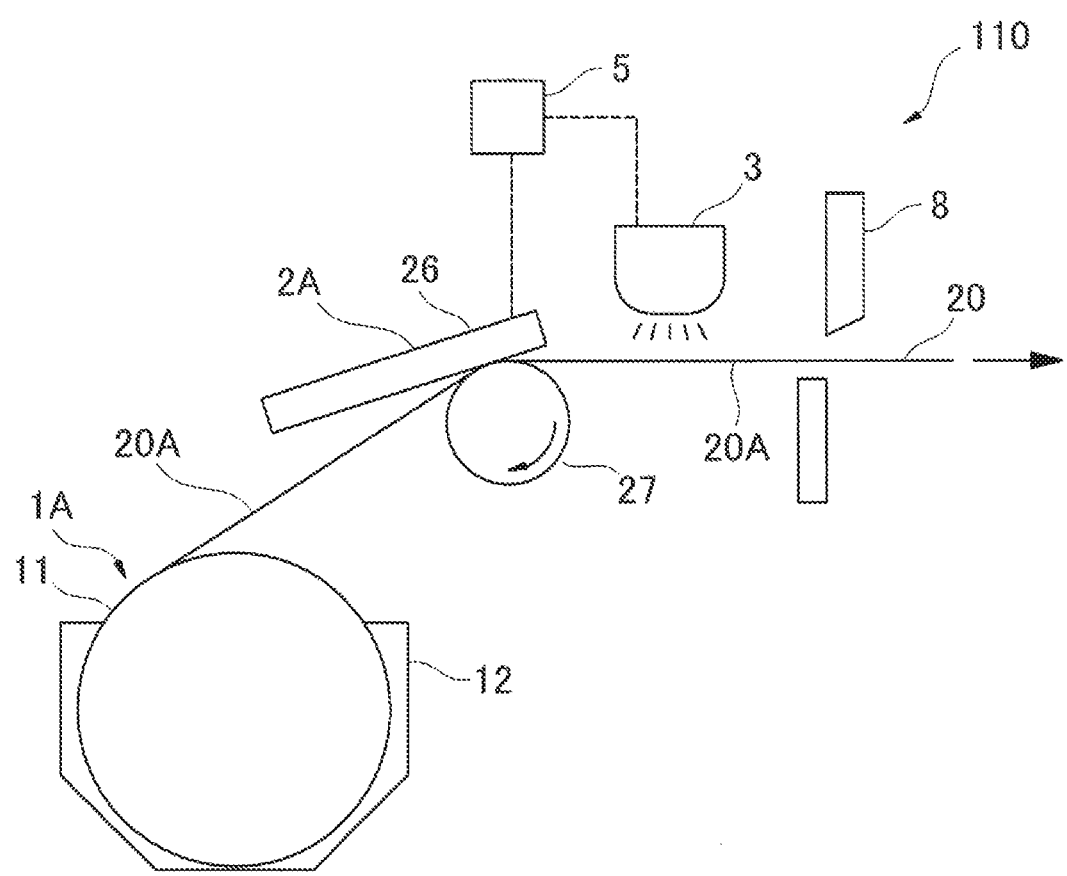
FIG. 7 is a schematic diagram for illustrating a temperature display device issuing apparatus according to a second embodiment of the present invention.

FIG. 7 is a schematic diagram for illustrating an issuing device 110 being a temperature display device issuing apparatus according to a second embodiment of the present invention. The issuing apparatus 110 includes a base feeder 1A, a printing/recording device 2A, the irradiation device 3, a moving mechanism (not shown), a controller 5, and a cutting device 8. The base feeder 1A is configured so that the roll 11 is housed in a housing portion 12 (rolled paper housing portion). The housing portion 12 houses the roll 11 in a manner that allows the roll 11 to rotate freely about the roll's axis. The base feeder 1A is capable of holding the roll 11 stably, owing to the housing portion 12.

The printing/recording device 2A includes a thermal head 26 and a platen roller 27. The thermal head 26 is capable of printing by heating a heat-sensitive paper area (for example, the time information display section 24 in FIG. 4, or the commercial product information 34 and the time information display section 38 in FIG. 6) of the temperature display device 20A. The platen roller 27 is capable of conveying the temperature display device 20A sandwiched between the platen roller 27 and the thermal head 26. The printing/recording device 2A is capable of efficiently printing on and conveying the temperature display device 20A.

The cutting device 8 cuts the temperature display device 20A processed in the printing/recording device 2A and the irradiation device 3 into pieces each having a desired length, to thereby obtain a temperature display device that is a single sheet (for example, the temperature display device 20 of FIG. 4).

In the issuing apparatus 110, which uses the printing/recording device 2A of the thermal recording method, the temperature display device 20A is heated during printing, but temperature detection is not started at the time of printing because the printing/recording device 2A is on the upstream side of the irradiation device 3 in the conveyance direction. The heating during printing accordingly does not affect the temperature history. An accurate temperature history can be displayed as a result. The issuing apparatus 110, which includes the cutting device 8, is capable of cutting the temperature display device 20A into pieces immediately after the temperature display device 20A is processed in the printing/recording device 2 and the irradiation device 3, to feed each of the pieces as a temperature display device (for example, the temperature display device 20 of FIG. 4).

What is claimed is:

1. A temperature display device issuing apparatus, which is configured to issue a temperature display device, the temperature display device including a temperature indicator having a function of starting temperature detection when irradiated with light, the temperature display device issuing apparatus comprising:
    a printing/recording device configured to print time information on the temperature display device;
    an irradiation device configured to irradiate the light onto the temperature indicator of the temperature display device;
    a controller configured to control printing in the printing/recording device and irradiation in the irradiation device; and
    a communicator through which the controller receives, from an external information terminal, display data including an irradiation time in which the temperature indicator is irradiated with the light,
    wherein the printing/recording device is configured to print, on the temperature display device, the time information corresponding to a time at which the temperature indicator starts temperature detection, based on the display data received through the communicator.

2. The temperature display device issuing apparatus according to claim 1, wherein the irradiation device is placed on a downstream side of the printing/recording device in a conveyance direction in which the temperature display device is conveyed.

3. The temperature display device issuing apparatus according to claim 1, wherein the irradiation device is placed on an upstream side of the printing/recording device in a conveyance direction in which the temperature display device is conveyed.

4. The temperature display device issuing apparatus according to claim 1, wherein the temperature display device includes a heat-sensitive paper area, which develops color when heated, and wherein the printing/recording device includes:
    a thermal head configured to heat the heat-sensitive paper area; and
    a platen roller configured to convey the temperature display device sandwiched between the platen roller and the thermal head.

5. The temperature display device issuing apparatus according to claim 1, wherein the temperature indicator includes a material having color that is changed by irradiation of light of a particular wavelength.

6. The temperature display device issuing apparatus according to claim 5, wherein the light irradiated onto the temperature indicator by the irradiation device includes an ultraviolet ray.

7. The temperature display device issuing apparatus according to claim 1,
wherein the display data further includes commercial product name information, which is to be printed along with the irradiation time, and
wherein the printing/recording device is configured to print, on the temperature display device, the commercial product name information along with a time at which the temperature indicator starts temperature detection, based on the display data received through the communicator.

8. The temperature display device issuing apparatus according to claim 7, wherein the controller is configured to transmit, to the external information terminal, through the communicator, print history information, which associates the commercial product name information printed by the printing/recording device with the time printed by the printing/recording device as a time at which the temperature indicator starts temperature detection.

9. The temperature display device issuing apparatus according to claim 1, further comprising a rolled paper housing device configured to house a roll of paper in a manner that allows the roll to rotate freely, the roll of paper being a wound long chain of a plurality of the temperature display devices.

10. The temperature display device issuing apparatus according to claim 9, further comprising a cutting device configured to cut the temperature display device on which the printing of the time information and the irradiation of the light are already performed into pieces, each of which has a desired length and serves as a single-sheet temperature display device.

11. A temperature display device issuing apparatus, which is configured to issue a temperature display device, the temperature display device including a temperature indicator having a function of starting temperature detection when irradiated with light,
the temperature display device issuing apparatus comprising:
    a printing/recording device configured to print time information on the temperature display device;
    an irradiation device configured to irradiate the light onto the temperature indicator of the temperature display device; and
    a controller configured to control printing in the printing/recording device and irradiation in the irradiation device
wherein the controller includes a time keeper configured to measure an irradiation time in which the temperature indicator is irradiated with the light, and
wherein the printing/recording device is configured to print, on the temperature display device, the time information corresponding to a time at which the temperature indicator starts temperature detection, based on the irradiation time output from the time keeper.

12. The temperature display device issuing apparatus according to claim 11, wherein the temperature indicator includes a material having color that is changed by irradiation of light of a particular wavelength.

13. The temperature display device issuing apparatus according to claim 11, wherein the light irradiated onto the temperature indicator by the irradiation device includes an ultraviolet ray.

14. The temperature display device issuing apparatus according to claim 11, wherein the irradiation device is placed on a downstream side of the printing/recording device in a conveyance direction in which the temperature display device is conveyed.

15. The temperature display device issuing apparatus according to claim 11, wherein the irradiation device is placed on an upstream side of the printing/recording device in a conveyance direction in which the temperature display device is conveyed.

16. The temperature display device issuing apparatus according to claim 11,
wherein the temperature display device includes a heat-sensitive paper area, which develops color when heated, and
wherein the printing/recording device includes:
    a thermal head configured to heat the heat-sensitive paper area; and
    a platen roller configured to convey the temperature display device sandwiched between the platen roller and the thermal head.

17. The temperature display device issuing apparatus according to claim 11, further comprising a rolled paper housing device configured to house a roll of paper in a manner that allows the roll to rotate freely, the roll of paper being a wound long chain of the plurality of temperature display devices.

18. The temperature display device issuing apparatus according to claim 17, further comprising a cutting device configured to cut the temperature display device on which the printing of the information and the irradiation of the light are already performed into pieces, each of which has a desired length and serves as a single-sheet temperature display device.

* * * * *